(No Model.)
C. J. SWANSTROM.
CURTAIN HOLDER.
No. 564,121. Patented July 14, 1896.
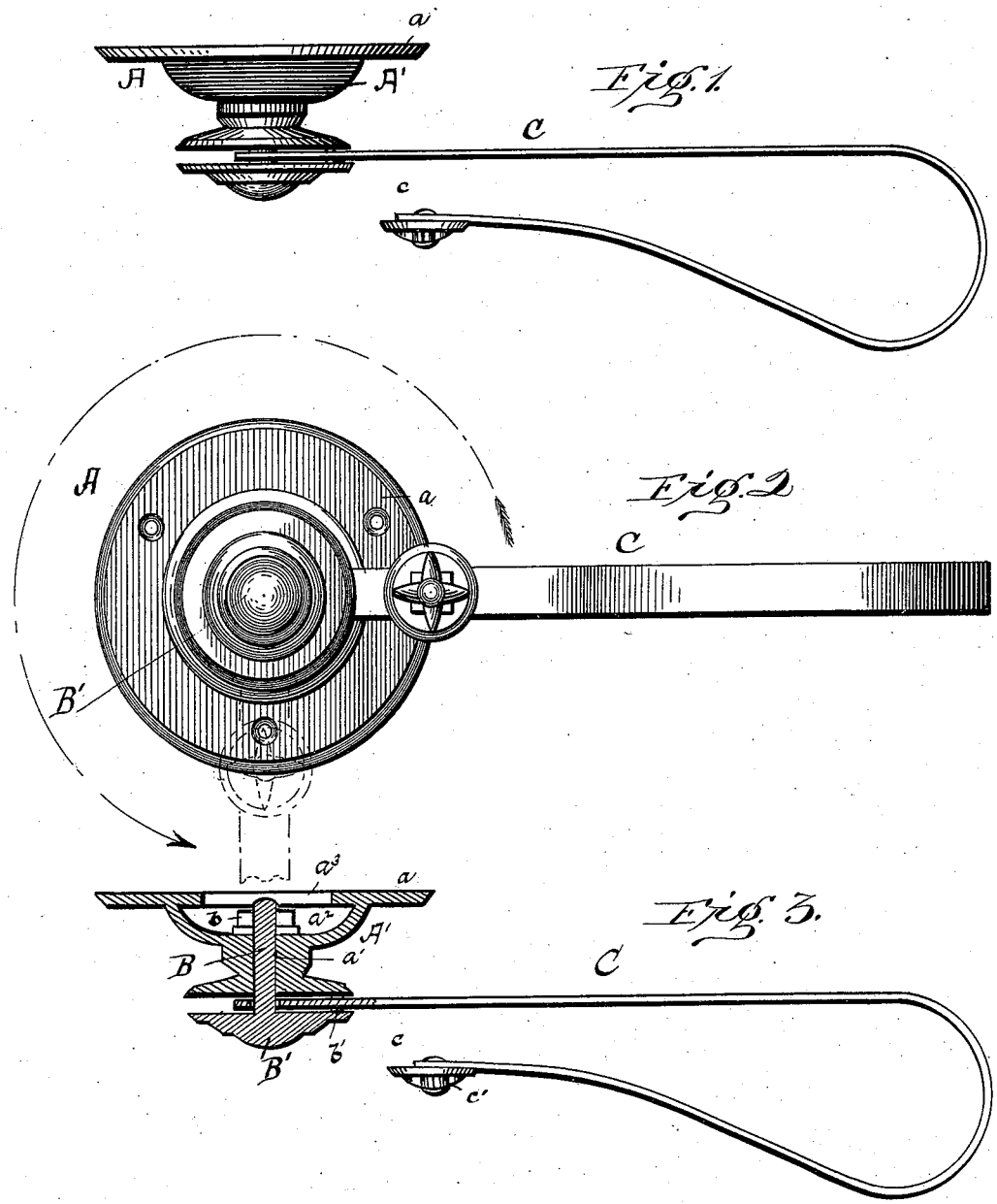
Witnesses:
J. W. Fowler Jr.
T. L. Dean
Inventor
Chas. J. Swanstrom
By Burton Macafee
Attorney.

UNITED STATES PATENT OFFICE.

CHARLES J. SWANSTROM, OF DEADWOOD, SOUTH DAKOTA.

CURTAIN-HOLDER.

SPECIFICATION forming part of Letters Patent No. 564,121, dated July 14, 1896.

Application filed April 5, 1895. Serial No. 544,688. (No model.)

*To all whom it may concern:*

Be it known that I, CHARLES J. SWANSTROM, a citizen of the United States, and a resident of Deadwood, in the county of Lawrence and State of South Dakota, have invented a new and useful Improvement in Curtain-Holders, of which the following is a specification.

My invention is an improvement in that class of window-curtain holders which are made in the form of open hooks, adapted to be secured to the window frame or casing.

The feature of novelty is the construction and arrangement of parts whereby a stop is provided for the pivoted rotatable curtain-hook proper, for holding it in normal working position, but is free to rotate from such position to the pendent position which it occupies when in disuse.

In the drawings, Figure 1 is a view looking down upon a device constructed in accordance with my invention. Fig. 2 is a side view of the same, and Fig. 3 is a sectional view.

The same letters of reference designate the same parts in the several figures.

The base A comprises a plate $a$, of suitable configuration, having openings through which screws are passed to secure the device to the frame of a window, and a main part A', which rises from said plate $a$ and is formed with a longitudinal opening $a'$ and with a chamber $a^2$ at its inner end, to which latter access may be had through an opening $a^3$ formed in said plate. Extending through said opening $a'$ and into said chamber $a^3$ is a pin B, the inner extremity of which is threaded and receives a nut $b$, which secures the pin in place, said nut being located within said chamber $a^2$, so that it will not interfere with the proper attachment of the device to the window-frame. The outer end of this pin is provided with an ornamental head B', which is so located with respect to the outer end of part A', that a space will be left between their adjacent surfaces, and at a proper place within said space is located a stop-pin $b'$.

C designates the arm which engages the curtain. One end of said arm extends into the space between the parts A' and B', and is pivotally mounted upon said pin B. Thence the arm extends outward a proper distance and is bent around and back, as clearly shown in the drawings. The free end of said arm terminates at such a place that an opening or mouth $c$ is provided, through which the curtain may be passed edgewise into the space formed by the bending of the arm for its reception.

When in operative position, the arm C is horizontal and rests upon the stop or supporting pin; but when further immediate use of the device is not required, said arm may be turned throughout three-fourths of a circle and caused to hang downward, as indicated in dotted lines in Fig. 2.

To detach the device from the window-frame, it is only necessary to remove the screws extending through plate $a$ and to separate the parts of the device from each other. The only further operation required is to unscrew nut $b$ and slip pin B out.

Preferably the free end of arm C is provided with an ornamental button $c'$.

Having thus described my invention, what I claim is—

1. The improved window-curtain holder, composed of the rotatable metal hook, and the device for securing the same to a wall, or other vertical support, which consists essentially of a metal base having a pin whereon said hook is pivoted, and a stop or rest for the hook, arranged between such base and head of the pin, which are separated at other points, to leave a free path for rotation of the hook from its extended or normal working position to the pendent position, as shown and described.

2. The combination, with the part A', having the plate or radial base extension $a$, provided with screw-holes, and a central open recess $a^2$, $a^3$, in the under side, of the headed pin, passing through the central bore in said part A', a nut arranged in said recess and screwed on the inner end of the pin, a stop $b'$ arranged between part A' and the head of the pin, and the metal hook, pivoted on said pin, and adapted to rotate thereon, save where interrupted by the stop, as shown and described.

CHARLES J. SWANSTROM.

Witnesses:
G. R. KIMBALL,
F. M. SMALLIDGE.